3,264,347
PROCESS FOR MAKING ACRYLIC ACID

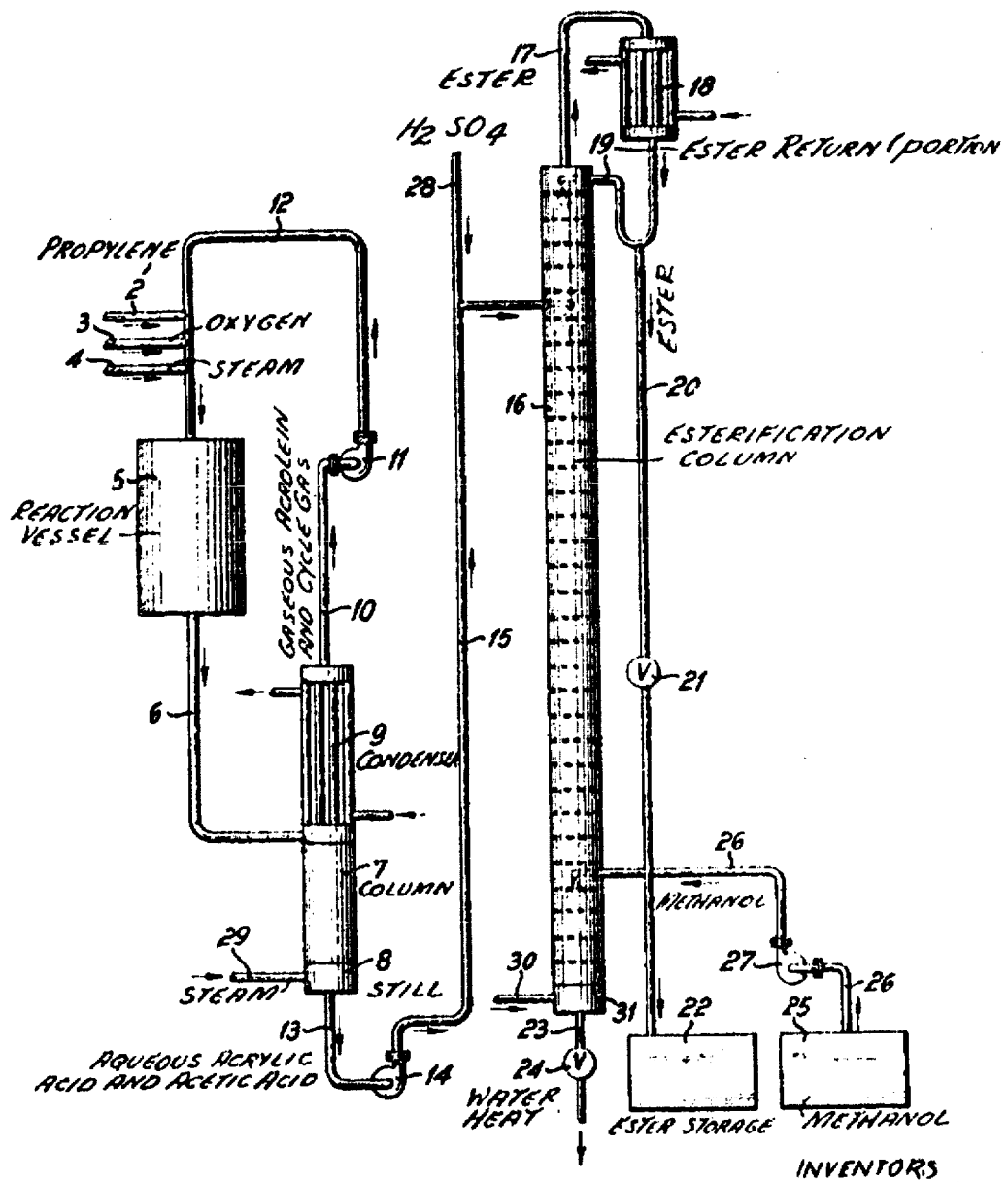

Kurt Sennewald and Wilhelm Vogt, Knapsack, near Cologne, Klaus Gehrmann, Efferen, near Cologne, and Stefan Schäfer, Brühl, Germany, assignors to Knapsack-Griesheim Aktiengesellschaft, Knapsack, near Cologne, Germany, a corporation of Germany
Filed Jan. 9, 1962, Ser. No. 165,208
Claims priority, application Germany, Jan. 26, 1961, K 42,735
4 Claims. (Cl. 260—533)

The present invention relates to a process for making acrylic acid and it also relates to a process for esterifying the aqueous solution of acrylic acid with methanol to obtain the acrylic acid methylester and still further it relates to an apparatus suitable for use in carrying out the invention.

It is known that acrylic acid can be obtained by oxidizing acrolein. U.S. Patents 2,881,213, and 2,881,214 describe processes for oxidizing acrolein in the gaseous phase with solid catalysts, the acrylic acid being obtained with yields of up to 50%. The German patent applications DAS 1,041,949 and 1,065,846 describe processes for oxidizing acrolein with oxygen in alkaline solutions with silver catalysts. These methods involve the disadvantage that the acrolein used as starting material must be isolated. Moreover, oxidation in an alkaline solution which admittedly involves good yields leads to the formation of the alkali metal salt of acrylic acid from which free acrylic acid can only be obtained with losses of yield.

The present invention provides a process for making acrylic acid without isolation of the acrolein intermediarily formed, by direct oxidation in the gaseous phase of propylene with solid catalysts, wherein acrolein together with unreacted propylene and inert gases, especially carbon oxides, is returned in a cycle to the reaction vessel after separation of the acrylic acid formed and after addition of fresh propylene and oxygen to replace the proportion of propylene and oxygen consumed.

More especially, the process of this invention is carried out as follows: propylene admixed with steam, is treated with oxygen at a raised temperature in the presence of a catalyst of the general composition $$Fe_aBi_bP_cMo_dO_e$$

wherein $a$, $b$, $c$, $d$ and $e$ represent the respective number of atoms and wherein $a$ and $b$ may represent independently from one another a value between about 0.1 and 12, $c$ a value between about 0 and 10, $d$ a value of about 12 and $e$ a value of between about 35 and 81, the initially aqueous acrylic acid is separated from the reaction mixture, and the acrolein-containing gas-mixture is returned in a cycle together with the starting components to the reaction zone. The elements iron, bismuth and molybdenum and possibly phosphorus may be used in the catalyst composition in the form of their oxides. The catalyst may advantageously be applied on to a carrier material, for example silica.

The propylene may be oxidized on a solid bed catalyst or in a flowing bed reactor. The results indicated in the examples below were obtained in a solid bed reactor having a diameter of 1.5 inches. This reaction tube was inserted in a furnace charged with liquid metal (tin, lead).

The time dwell of the propylene/acrolein/oxygen/inert gas-mixture on the catalyst was between about 0.1 to 20 seconds, preferably 0.1 and 1.5 seconds. The oxidation reaction was carried out at temperatures between about 280 and 450° C., preferably about 350 and 420° C. and under a pressure between about 0.1 atmosphere absolute and 10 atmospheres gauge, advantageously atmospheric pressure.

The composition of the gas-mixture depends on the proportions of propylene and oxygen added, for example continuously, to the cycle gas. Propylene and oxygen should be added in proportions such that the cycle gas contains a rather constant amount of propylene and acrolein.

The cycle gas may be composed as follows:

| | Mol percent |
|---|---|
| Propylene | 5 |
| Acrolein | 2 |
| Oxygen | 6 |
| Steam | 30 |
| Carbon dioxide | 40 |
| Carbon monoxide | 12 |
| Hydrogen | 5 |

Before entering into the reaction vessel, the cycle gas is generally admixed with propylene and oxygen each in a proportion of up to about 8% by volume, preferably with about 1.5 to 3 mols oxygen per mol added propylene. The cycle gas is also mixed, per mol added propylene, with about 3 to 10 mols water in the form of steam as diluting agent. Steam must generally be added. It serves not only as diluting agent but also substantially avoids the combustion of propylene and acrolein to carbon dioxides.

According to a further feature of this invention, acrylic acid is separated continuously from the reaction mixture by cooling said mixture to a temperature such that the water included therein together with acrylic acid, acetic acid, if any, and a portion of acrolein condense. The dissolved acrolein portion is then expelled by injecting steam and returned jointly with the cycle gas to the reaction zone. The reaction mixture is preferably cooled down to a temperature of about +10° C.

It is a further feature of this invention that the aqueous portion containing acrylic acid and possibly acetic acid withdrawn from the cycle is admixed with sulfuric acid as catalyst and then introduced into the upper part of a vapor-heated esterification stage. At the same time, methanol is introduced into the lower part of said stage and an azeotropic mixture of acrylic acid methylester, acetic acid methylester and methanol is withdrawn at the head of said esterification stage, cooled and released, if desired, and then converted in known manner into acrylic acid methylester. The batch to undergo esterification is admixed with about 0.1 to 0.5% by weight concentrated sulfuric acid. The pressure used in the esterification stage is between about 1 atmosphere absolute and 20 atmospheres gauge, the sump of the esterification stage being maintained at temperatures of between about 130° and 200° C. and the ratio of organic acid portion:methanol in the esterification stage being about 1:5.

An apparatus suitable for use in carrying out the process of this invention is shown diagrammatically and by way of example in the accompanying drawing.

The hot reaction gas containing acrylic acid, acrolein and propylene which leaves reaction vessel 5 is conducted via off-pipe 6 to the head of a column 7 provided with a condenser 9 in which the water included in the reaction gas together with the acrylic acid and a portion of the acrolein is condensed. In column 7 and its still 8 the aqueous acrylic acid solution is freed from dissolved acrolein by injecting steam via feed-pipe 29; gaseous acrolein is returned together with the cycle gas through condenser 9 in which it is cooled to about +10° C., off-pipe 10, pump 11 and cycle pipe 12 to reaction vessel 5. Before the acrolein is being returned, the gas mixture is admixed with fresh propylene via feed pipe 2 to replace the propylene consumed, with fresh oxygen via feed-pipe 3 to replace the oxygen consumed, and with steam via feed-pipe 4.

From still 8 of column 7, an aqueous acrylic acid solution of about 4 to 15% strength and containing about 0.4 to 1.2% by weight acetic acid is conveyed via bottom off-pipe 13, pump 14 and pipe 15 to the upper third of an esterification column 16 comprising 40 bubble trays, for example. This aqueous solution is previously admixed through feed-pipe 28 with 0.1 to 0.5% by weight concentrated sulfuric acid which serves as esterification catalyst. The lower third of said esterification column 16 is supplied from a storage tank 25 through pipe 26 and pump 27 with the methanol required for esterification. The esterification column which may be operated at atmospheric or raised pressure up to about 20 atmospheres delivers in vapor form via head pipe 17 an azeotropic mixture of acrylic acid methylester, acetic acid methylester and methanol which is totally condensed in condenser 18. A portion of the condensed material is charged through reflux pipe 19 to the head of the esterification column 16 while a second portion is delivered through branch-off pipe 20 and if desired after having been released by valve 21 to a storage tank 22.

The water set free inter alia by the esterification of acrylic acid and acetic acid is removed together with the sulfuric acid from still 31 of esterification column 16 through bottom off-pipe 23, if desired after having been released to atmospheric pressure by means of valve 24. Column 16 is preferably vapor-heated via lower feed-pipe 30.

The methanol-containing mixture of acrylic acid methylester and acetic acid methylester collected in storage tank 22 may be worked up in known manner by extractive distillation with water, subsequent distillative dehydration and further distillation to obtain the pure material.

The following examples serve to illustrate the invention, but they are not intended to limit it thereto.

The preparation of the catalyst used in the examples is disclosed in French Patent No. 1,275,204 wherein a solution of 282.8 grams $Fe(NO_3)_3 \cdot 9H_2O$ in 300 cc. water and a solution of 97.0 grams $Bi(NO_3)_3 \cdot 5H_2O$ in 100 cc. water admixed with 20 cc. concentrated nitric acid are introduced into 1086 grams aqueous colloidal silicic acid having a $SiO_2$-content of 14% by weight, and 11.5 grams $H_3PO_4$ (85% strength) and 172.8 grams $MoO_3$ are ultimately added. The resulting mixture is evaporated to dryness while being stirred, dried for 16 hours at 150° C. and sintered for 12 hours 500° C. The resulting crumbly mass was comminuted and screened so as to obtain grains having a size of 3 to 4 mm.

*Example 1*

500 cc. of a catalyst of the composition $Fe_7Bi_2PMo_{12}O_{52}$ on 35% by weight silica gel as carrier were introduced into a reaction vessel having a diameter of 1.5 inches and inserted in a furnace charged with liquid tin. During the reaction, the reaction vessel was maintained at about 400° C. at atmospheric pressure. 15 g. (0.357 mol) propylene were added per hour to the cycle gas indicated below; oxygen was added in a proportion that the cycle gas contained:

| | Mol percent |
|---|---|
| Propylene | 7.3 |
| Acrolein | 3.6 |
| Oxygen | 8.2 |
| Carbon dioxide | 53.0 |
| Carbon monoxide | 19.9 |
| Hydrogen | 8.0 |

Before the reaction vessel, the above cycle gas was also admixed with steam in a proportion such that the molar ratio of oxygen to steam was at 1:5.

The amount of gas cycled was 1200 l./hr. and the time dwell in the reaction vessel 0.5 second. After leaving the reaction furnace, the reacted gas mixture was conveyed to the head of a packed column 50 cm. long and provided with a mounted condenser in which the gas mixture was cooled to +10° C. The water condensed together with acrylic acid, acetic acid and a portion of the acrolein formed. The aqueous solution so obtained was freed from acrolein by injecting steam into the still of the column and the acrolein was conveyed in gas form together with the cycle gas to the reaction vessel. The acrylic acid formed was removed together with the acetic acid as aqueous solution from the still of the column. 13.96 g./h. (0.194 mol) acrylic acid included in 250 g. water were obtained. The yield thus amounted to 54.3%, calculated on the propylene reacted. 2.1 g. acetic acid were also obtained.

This aqueous solution was admixed with 0.3% by weight concentrated sulfuric acid and then conveyed to the upper third of an esterification column. The lower third of the esterification column was charged per hour with 25 g. methanol. The esterification in the column was effected at 125° C. 16.0 g./h. acrylic acid methylester, 2.3 g./h. acetic acid methylester and 19 g./h. methanol which were separated from one another as usual distilled off at the head of the column.

The total yield of acrylic acid methylester, calculated on the propylene consumed, i.e. propylene reacted, amounted to 52%.

*Example 2*

500 cc. of a catalyst having the composition $$Fe_{0.583}Bi_{0.167}P_{0.083}Mo_{12}O_{37.3}$$

on 25% by weight $SiO_2$ as carrier were introduced into a solid bed reactor having a diameter of 1.5 inches and inserted in a furnace charged with liquid metal (tin, lead). During the reaction, the reaction vessel was maintained at 370° C. at atmospheric pressure.

18 g./h. (0.428 mol) propylene were added to the cycle gas indicated below; oxygen was added in a proportion such that the cycle gas contained:

| | Mol percent |
|---|---|
| Propylene | 6.5 |
| Acrolein | 8.3 |
| Oxygen | 4.2 |
| Carbon dioxide | 55.0 |
| Carbon monoxide | 23.0 |
| Hydrogen | 3.0 |

Before the reaction vessel, the cycle gas was further admixed with steam in a proportion such that the cycle gas contained about 30% by volume steam. The reaction mixture was then processed in the manner indicated in Example 1. The yield of acrylic acid was 58.7%, and the additional yield of acetic acid 13%, calculated on the propylene reacted. The aqueous solution obtained was esterified in the manner described in Example 1 and the acrylic acid methylester was obtained in a yield of 53.5%, calculated on the propylene which underwent reaction.

*Example 3*

The following table indicates that the yeild of acrylic acid is a function of the catalyst composition. All the catalysts used contained 60% by weight $SiO_2$ as carrier material. The conditions under which the reactions were carried out were identical.

| Catalyst composition | Yield of acrylic acid in percent, calculated on the propylene that underwent reaction. |
|---|---|
| $PMo_{12}O_{38.5}$ | 15.8 |
| $Fe_{0.58}Bi_{0.17}P_{0.08}Mo_{12}O_{37.3}$ | 23.7 |
| $Fe_{1.1}Bi_{0.31}PMo_{12}O_{40.6}$ | 30.8 |
| $Fe_{2.34}Bi_{0.67}PMo_{12}O_{43}$ | 40.8 |
| $Fe_{3.3}Bi_{0.95}PMo_{12}O_{44.9}$ | 30.3 |
| $Fe_{4.3}Bi_{1.2}PMo_{12}O_{45.3}$ | 40.3 |
| $Fe_{5.6}Bi_{1.6}PMo_{12}O_{49.3}$ | 40.5 |
| $Fe_7Bi_2PMo_{12}O_{52}$ | 48.0 |
| $Fe_{8.6}Bi_{2.36}PMo_{12}O_{55}$ | 43.4 |
| $Fe_{28}BisPMo_{12}O_{92.5}$ | 22.5 |

We claim:
1. A process for the manufacture of acrylic acid which comprises reacting a gas mixture consisting essentially of up to about 8% by volume each of propylene and oxygen, and the balance being carbon monoxide, carbon dioxide, acrolein, hydrogen and steam at temperatures within the range of about 280° C. and 450° C. and under a pressure of between about 0.1 atmosphere absolute and 10 atmospheres gauge in the presence of a catalyst consisting of a mixture of oxides of elements of the general composition $Fe_aBi_bP_cMo_d$, wherein $a$ and $b$ each represent a value between about 0.1 and 12, $c$ represents a value between about 0.08 to 10 and $d$ represents a value of about 12, the residence time of the gas-mixture on the catalyst being within the range of between about 0.1 and 20 seconds, separating the initially aqueous acrylic acid continuously from the reaction mixture by cooling said mixture to a temperature of about +10° C. whereby a mixture of water included in the reacted gas together with acrylic acid, acetic acid and a portion of the acrolein formed condense, expelling the dissolved portion of acrolein by injecting steam into said mixture, separating acrylic acid from said acetic acid and water, and returning the expelled acrolein together with the cycle gas consisting essentially of carbon monoxide, carbon dioxide, hydrogen, propylene and acrolein, and with the starting components propylene, oxygen and steam, about 1.5 to 3 mols oxygen and about 3 to 10 mols water in the form of steam being added per mol added propylene, to the reaction zone.

2. The process of claim 1 wherein the catalyst is applied upon a silica gel carrier.

3. The process of claim 1 wherein the oxidation reaction is carried out at atmospheric pressure and at temperatures within the range of between about 350 and 420° C.

4. The process of claim 1 wherein the residence time of the gas mixture is within the range of between about 0.1 and 1.5 seconds.

References Cited by the Examiner

UNITED STATES PATENTS

| | | | |
|---|---|---|---|
| 1,998,413 | 4/1935 | Reppe et al. | 260—486 |
| 2,941,007 | 6/1960 | Callahan et al. | 260—533 |
| 3,065,264 | 11/1962 | Koch et al. | 260—533 |
| 3,171,859 | 3/1965 | Sennewald et al. | 260—604 |

FOREIGN PATENTS

| | | |
|---|---|---|
| 210,283 | 9/1957 | Australia. |
| 1,275,204 | 9/1961 | France. |

LORRAINE A. WEINBERGER, *Primary Examiner.*

CHARLES B. PARKER, LEON ZITVER, *Examiners.*

G. P. D'ANGELO, I. R. PELLMAN, L. A. THAXTON, *Assistant Examiners.*